United States Patent [19]

Hawk

[11] Patent Number: 4,676,052
[45] Date of Patent: Jun. 30, 1987

[54] SELF-PROPELLED DREDGE

[76] Inventor: James L. Hawk, 22435 SE. 288th, Kent, Wash. 98031

[21] Appl. No.: 780,918

[22] Filed: Sep. 27, 1985

[51] Int. Cl.⁴ ............................................ A01D 44/00
[52] U.S. Cl. ............................................ 56/8; 37/71; 37/54; 114/26
[58] Field of Search ............... 56/8, 9, DIG. 2; 37/54, 37/55, 57, 71; 114/26

[56] References Cited

U.S. PATENT DOCUMENTS

| | | | |
|---|---|---|---|
| 1,785,492 | 12/1930 | Orloff | 56/8 |
| 1,843,809 | 2/1932 | Dumbolton | 56/8 |
| 2,770,057 | 11/1956 | Camp | 37/103 |
| 3,113,389 | 10/1963 | Vuskovich | 56/8 |
| 4,070,978 | 1/1978 | Virgilio | 56/8 |
| 4,416,106 | 11/1983 | Hawk | 56/9 |

Primary Examiner—Robert Peshock
Assistant Examiner—John G. Weiss
Attorney, Agent, or Firm—Christensen, O'Connor, Johnson & Kindness

[57] ABSTRACT

A self-propelled dredge includes a floating hull and a propulsion unit associated with the hull to propel the hull at the direction of an operator. Preferably, the propulsion unit includes a pair of paddlewheels disposed on opposite sides of the hull and independently operable to provide maneuverability to the hull. A boom is mounted on the front end of the hull in cantilevered fashion and a bucket is attached to the distal end of the boom to scoop material from the bottom of a body of water during operation of the dredge. Rigging is provided between the hull and the boom to allow the operator to raise and lower the boom to dip the bucket into and out of the water. The bucket has a pivotable scoop portion that actually receives the material being dredged and a stationary cover portion that is affixed to the boom. The scoop portion is movable between first and second positions and in a first position the scoop means is spaced from the cover plate to allow material to enter the bucket, and in a closed position the cover plate closes the opening in the scoop portion, preventing the exit of dredged material from the scoop portion. The bucket means is arranged on the end of the boom so that when the scoop portion moves from its first to its second position the bucket actually pivots on the nose of the scoop portion and pushes the boom in an upward direction away from the lake bottom to prevent the bucket from becoming stuck in the material at the lake bottom.

9 Claims, 3 Drawing Figures

SELF-PROPELLED DREDGE

BACKGROUND OF THE INVENTION

This invention relates to dredges for removing silt, muck, and plant growth from the bottom of lakes, ponds, or similar bodies of water and, more particularly, relates to a self-propelled dredge mounted on a motorized barge, having a sealable bucket to enhance the dredge's ability to remove silt, peat, and other waterborne solids from the bottom of lakes, ponds, bays, and other bodies of water.

In the development of recreational waterfront property, particularly on small lakes, ponds, or bays, it is desirable to provide a clean gravel bottom adjacent the shoreline so that the shoreline property owner can utilize the water for swimming, boating, fishing, and other recreational uses. While most lakes have a gravel bottom, the gravel is many times covered by layers of peat or silt or other soft materials that are undesirable from a recreational standpoint. A gravel bottom provides a much better breeding ground for fish, since many of the game fish spawn in gravelly river and lake bottoms. Also, a gravel bottom tends to be less prone to growth of aquatic weeds, such as water lilies and milfoil, thereby making the area adjacent the shore more desirable for swimming and boating.

Even after an area is developed, and after the developer cleans up the lake bottom, after several years the bottom tends to again be covered by silt and muck and plant growth that must periodically be removed. At this point, however, there is many times a dock or a float positioned adjacent the shore for use in swimming and boating that provides some maneuverability problems for large dredges of the type currently in use. Also, the cost of operating a large dredge is usually prohibitive for individual property owners or even for small waterfront communities.

It is therefore an object of this invention to provide a dredge that is self-propelled and highly maneuverable, primarily for use in small areas and around existing structures, such as docks, swimming floats, et cetera.

It is another object of the invention to provide a dredge that efficiently removes water-borne solids, such as peat and silt that are of a density nearly equal to that of the water in which they are carried.

SUMMARY OF THE INVENTION

In accordance with the above-stated objects, a dredge is provided that includes a hull, the hull being propelled by a propulsion unit mounted thereon. A movable boom extends from the hull and a sealable bucket means is attached at a distal end of the boom. The boom is rigged to the hull in such a manner that the boom can be raised and lowered to bring the bucket into and out of the water.

The bucket means includes a movable bucket member pivotally attached to the boom and a rigid sealing member affixed to the boom adjacent the bucket and cooperable with the bucket, such that when the bucket is moved from its open to its closed position it is covered by the rigid cover member in a substantially sealed fashion. Preferably, the bucket has an outlet opening formed in it to allow the passage of water through the bucket as the bucket moves across the bottom being dredged.

BRIEF DESCRIPTION OF THE DRAWINGS

The construction, operation, and advantages of the present invention will be better understood by those of ordinary skill in the art and others upon reading the ensuing specification when taken in conjunction with the appended drawings wherein.

DETAILED DESCRIPTION OF THE PREFERRED EMBODIMENT

Figure 1:
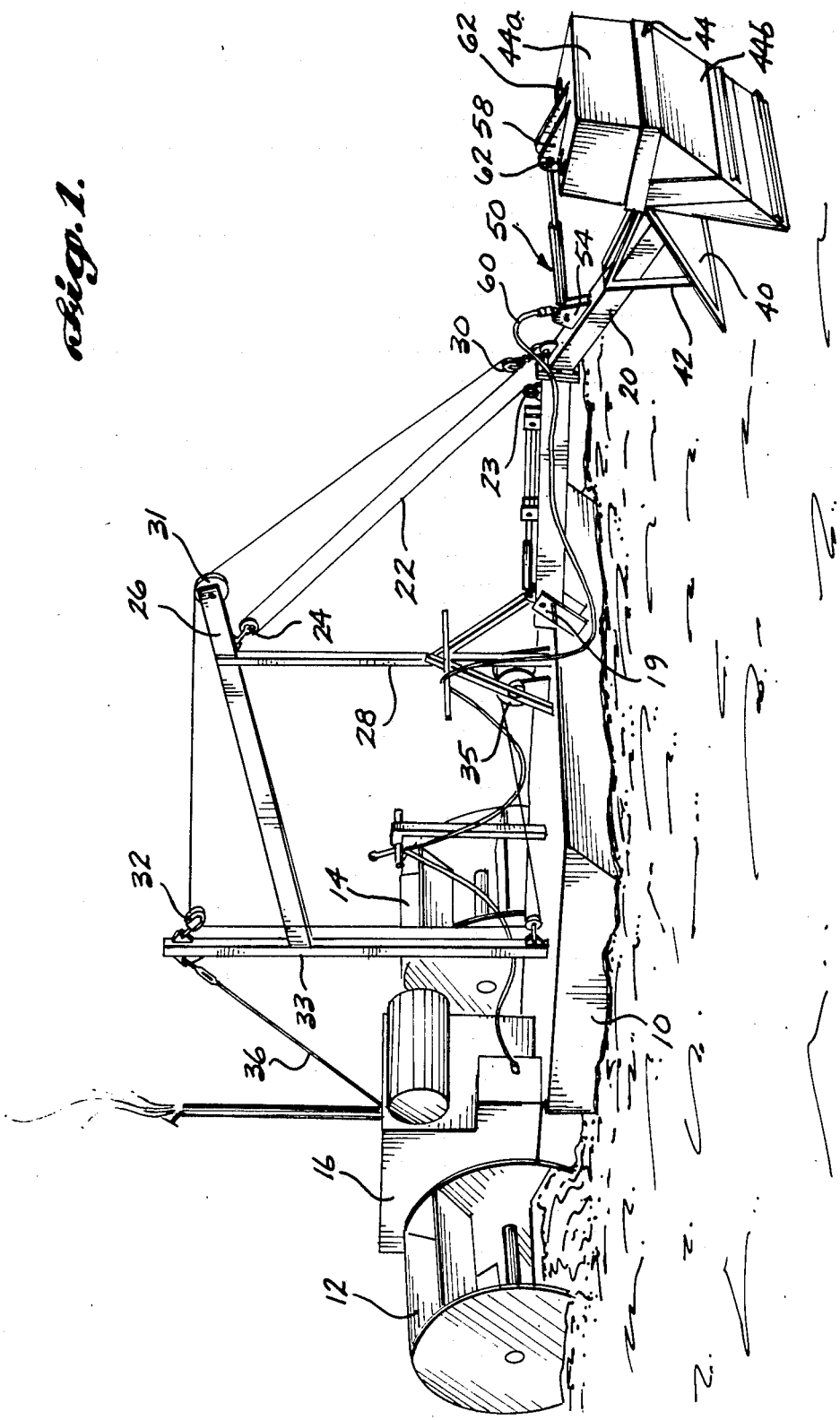
FIG. 1 is an isometric view of one embodiment of a dredge made in accordance with the principles of the present invention.

Referring now to FIG. 1, a preferred embodiment of a dredge made in accordance with the principles of the present invention is illustrated as having a hull 10 of essentially flat-bottomed shape. The hull is propelled by a pair of paddlewheels 12 and 14, respectively, one mounted on each side of the hull 10 toward the aft end. In the illustrated embodiment, the paddlewheels are hydraulically driven by pressurized hydraulic fluid delivered by a diesel motor pump 16 mounted at the aft end of the hull between the paddlewheels. While a hydraulically driven paddlewheel arrangement is illustrated, it will be understood by those of ordinary skill in the art that other propulsion means can be used. The paddlewheels 12 and 14 are independently operable to provide maneuverability to the dredge. The dredge is maneuvered by changing the speed or direction of rotation of one paddlewheel vis-a-vis the other. For example, in order to get the hull to turn, one paddlewheel can be rotated while the other is held motionless, or the paddlewheels could be rotated in opposite directions to turn the hull in a tight circle. The paddlewheels can also be driven in reverse to move the dredge backward.

A main boom section 18 is mounted in cantilevered fashion extending from the forward end of of the hull 10. A first end of the main boom section 18 is pivotally mounted to a boom bracket 19 affixed to the hull 10. A secondary boom section 20 is attached to a second end of the main boom section 18. The secondary boom section 20 is angled slightly downwardly with respect to the main boom section 18. The main boom section 18 is pivotally attached to the hull 10 so that it can be swung up and down and lowered into the water ahead of the hull. A cable 22 is attached to the main boom section near the point of attachment of the secondary boom section and utilized to control the up-and-down movement of the entire boom assembly. One end of the cable 22 is attached to a ring 23 on the main boom section and passes over a pulley 24 attached to a crossbeam 26 that is supported by a forward mast 28 vertically arranged on the forward end of the hull 10. The cable 22 continues on to a second pulley 30, attached to the secondary boom section 20 near its attachment point to the main boom section, and forward of the ring 23. Cable 22 then is routed up and aft over a pulley 31 rotatably mounted on the forward end of the crossbeam 26. From the pulley 31 on crossbeam 26, the cable 22 runs back to another pulley 32 mounted on the uppermost portion of a mainmast 33 that extends upwardly from the deck of the hull 10. The cable 22 runs down the mainmast 33 over a pulley 34 located at the bottom of the mainmast and forward to a winch 35 that reels the cable in and out to raise and lower the boom assembly, comprising boom sections 18 and 20. A guy wire 36 has its first end affixed to the uppermost portion of the mainmast 33 and its second end affixed to the aft portion of the hull to provide lateral support for the mainmast. An aft end of the crossbeam 26 is attached to an intermediate portion of the mainmast 33 to provide stability to the crossbeam and mainmast.

Figure 2:
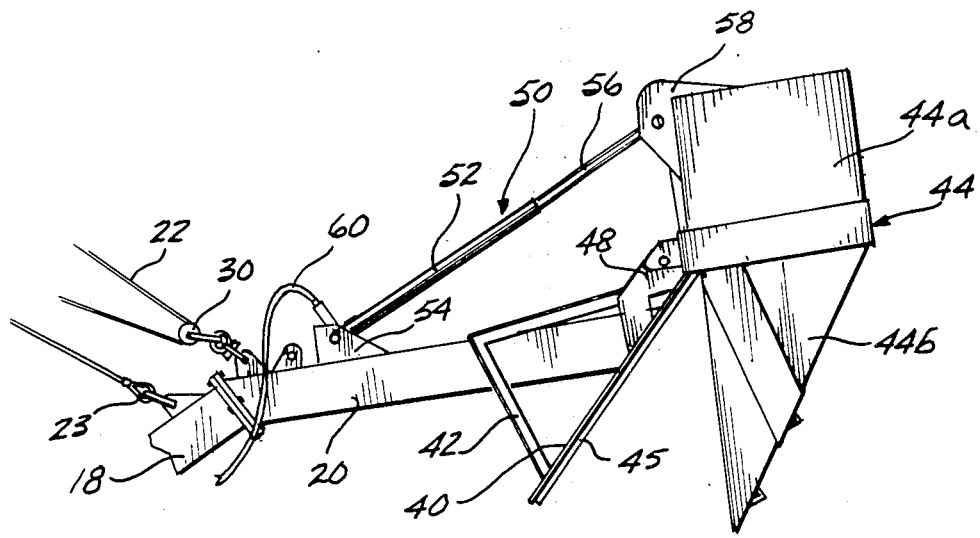
FIG. 2 is a side elevational view of the boom and bucket of the dredge shown in FIG. 1 with the bucket in the open position.
Figure 3:
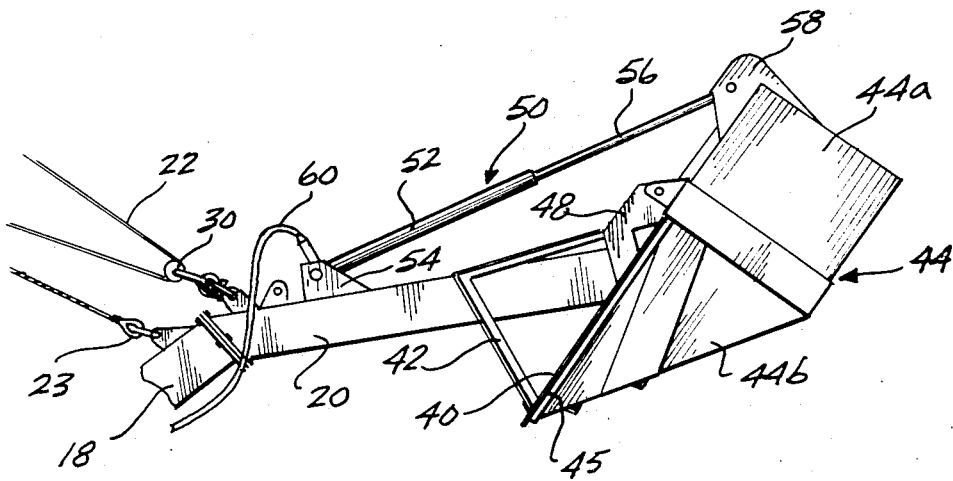
FIG. 3 is a side elevational view of the bucket of FIG. 2 in the closed position.

A dredge bucket assembly is mounted on the forward end of the secondary boom section 20 and is illustrated in FIGS. 2 and 3. The bucket assembly includes a cover plate 40 affixed to the end of the secondary boom section 20. The cover plate 40 is rigidly attached to the boom, such as by welding, and a reinforcing bracket 42 is mounted to the boom and the backside of the cover plate to provide structural strength to the plate during operation of the dredge to be described below. A bucket 44 comprising a first box-like portion 44a and a second scoop portion 44b is hingedly affixed to the free end of the boom section 20 by hinge bracket 48. The bucket 44 is therefore free to pivot about the hinge bracket 48 between an open position in which material can enter and exit the scoop, and a closed position in which the material is kept within the bucket. The box-like portion 44a is closed on all sides, except that side connected to the scoop portion 44b. The scoop portion 44b is triangular in side view and has an open side directly opposite the cover plate 40. When the bucket 44 is in its open position, as shown in FIG. 2, the scoop portion 44b is spaced from the cover plate 40 to allow the entry or exit of material to and from the scoop. When the bucket 44 is pivoted to its closed position, as shown in FIG. 3, the cover plate abuts the scoop portion 44b and closes it to prevent the entry or escape of material. Preferably, the cover plate 40 has a sealing ridge piece 45 mounted in a rectangular configuration spaced inwardly from the edge of the cover plate to provide a lip around the perimeter of the cover plate. The ridge piece 45 is of a size and is positioned so that when the cover plate 40 contacts the scoop portion 44b, i.e., when the bucket is in the closed position, the ridge piece 45 fits just outside the rim of the open side of the scoop portion and the lip of the cover plate overhangs the sides of the scoop portion to securely close the scoop portion 44b.

The bucket 44 is moved between its open and closed positions by the action of a linear hydraulic actuator 50 mounted between the box portion 44a and the secondary boom section 20. The hydraulic actuator includes a cylinder 52 attached at a first end thereof to a bracket 54 affixed to the boom section 20. A second end of the cylinder 52 receives an actuator piston rod 56 that slides within the cylinder 52. A free end of the rod 56 is attached to a bracket 58 affixed, such as by welding, to the box-like portion 40a. A hydraulic line 60 runs from the hydraulic pump means 16 mounted on the hull and is connected to the hydraulic cylinder 52. Flow of hydraulic fluid into the hydraulic cylinder is regulated by the operator of the dredge to open and close the bucket during operation of the dredge.

In operation, the dredge is propelled by the paddlewheels 12 and 14 to a location at which dredging is to take place. When the dredge is at the desired location, the operator activates winch 35 and lowers the boom assembly into the water, with the bucket 44 in the open position, until the forward tip of the scoop portion 44b contacts the lake bottom. Preferably, the operator simultaneously moves the dredge in reverse as the bucket is lowered so that there is a horizontal force component acting on the bucket when it contacts the lake bottom. In this manner the scoop has momentum to keep it from acting as an anchor to restrain the dredges movement. The entire dredge is moved backward by reversing rotation of the paddlewheels 12 and 14 so that the bucket 44 is dragged across the lake bottom, scooping silt and mud and debris along with roots of aquatic plants present on the bottom into the bucket. Preferably, slots 62 are formed in one side of the box-like portion 40a to permit the escape of water as the bucket is dragged to lessen the resistance to movement of the bucket along the bottom. When the operator believes the bucket is filled, he operates the hydraulic actuator 50 to move the bucket to the closed position and raises the boom by means of cable 22 and winch 35. The dredge with the filled bucket is then moved to a location at which the debris contained in the bucket is to be dumped, which can either be onshore or, if it is a large lake or other body of water, to a waiting barge or floating hopper that could be anchored near the dredging site. The sealed relationship of the cover plate 40 to the scoop portion 44b prevents the loss of material from the bucket when it is raised. It is necessary to close the bucket 44 in such a substantially sealed manner, since much of the material picked up is in suspension in water and is of a density that is only slightly greater than water so that it will flow rather freely out of the bucket if the bucket is open. Occasionally, a large root or limb lying at the bottom of the lake will become caught between the scoop portion 44b and the cover plate 40, preventing complete closure of the cover plate over the scoop portion. In such a case, much of the material raised will be dumped back out of the scoop portion prior to its appearance at the water surface; however, the scoop portion and the cover plate act as a grip to allow removal of the branch and allow the operator to carry that branch to the dump site and then return to the dredge site after the branch is dropped off. The angle of the secondary boom helps in providing the proper angle to the bucket when it is near the bottom. Also, in shallow water the bucket is only partially opened to keep the bucket tip angle back with relation to the bottom. If the bucket was fully open the tip of the bucket would gouge the bottom instead of scraping the bottom as intended.

Many times the bucket of a dredge will become stuck in the silt and mud at the bottom of a lake and be very difficult to bring up, particularly when the bucket is filled with material. However, the bucket of the dredge of the present invention is designed to assist itself up out of the mud upon closing. The hydraulic actuator 50 actually pushes the box-like portion 44a in a clockwise direction, as viewed in FIGS. 2 and 3, when the bucket closes. The bucket pivots on the tip of the scoop portion 44b on the lake bottom and the reaction of the bucket to the force applied by hydraulic actuator 50 is to provide a lift force on the boom that actually raises the boom and bucket somewhat, thereby freeing the bucket from the lake bottom.

Since the propulsion system that moves the dredge from place to place is also used to provide the force to drag the bucket along the bottom, scooping material into the bucket, it is not necessary to anchor the dredge during dredging operations, as is common with most dredges. This allows complete mobility of the dredge during the dredging operation so that it can move easily from place to place, accomplishing small dredging jobs and then moving on to the next job, covering, for example, several adjacent waterfront properties. Also, the independently operable paddlewheels provide for significant maneuverability of the dredge so that it can come in and work close to the shore or close to the docks or other structures and selectively dredge around those docks without the fear of damaging the dock. The flat-bottomed nature of the hull allows the dredge to operate in shallow water so that it can run up, essentially next to the shore, to unload material dredged from the bottom directly into the bucket of a front-loader that can be driven down to the shoreline to aid in the debris removal process. While a dredge of the present invention could be designed in any size, it is primarily intended for use in small operations, and the bucket would most likely be of a size to accommodate approximately one-half of a yard of material. Such a size is very useful in smaller lakes for cleaning up lake bottom that has been silted in over the years and also for clearing aquatic weeds and plants from shorelines or around docks to permit access to boats.

While a preferred embodiment of a dredge made in accordance with the principles of the present invention has been described and illustrated herein, it will be apparent that many changes can be made to the illustrated and described embodiment, while remaining within the scope of the invention. For example, propulsion means other than the paddlewheels described could be used to move the dredge; however, it has been found that the paddlewheels provide suitable power to both propel the dredge at a reasonable rate of speed and also to provide the necessary power to drag the bucket across the bottom, scooping muck and silt from the bottom and dislodging plant roots. Also, the paddlewheels provide excellent maneuverability. Even if paddlewheels are used, the propulsion system could use other than hydraulically driven paddlewheels and could have the paddlewheels driven directly by a steam engine or diesel motor or some other means. Further, the exact configuration of the hull described and illustrated is not considered critical to the invention and other hull shapes could be used, although the flat-bottomed, barge-like hull illustrated and described allows operation of the dredge in relatively shallow water to permit dredging operations near shore. The depth at which the dredge operates is determined by the length of the boom, since the dredge can operate only in water shallow enough to allow the bucket to touch bottom when the boom is fully submerged. The length of the boom is limited to some degree by the forces exerted on the hull when a fully loaded bucket is raised at the end of the boom, causing a forward loading on the hull. However, it has been found that the flat-bottomed hull described and illustrated will accommodate a boom about 14 feet long, which permits operation of the dredge in water up to about 12 feet deep. Since changes can be made to the illustrated embodiment, while remaining within the scope of the invention, the invention should be defined solely with reference to the claims that follow.

The embodiments of the invention in which an exclusive property or privilege is claimed are defined as follows:

1. A dredge apparatus comprising:
a floating hull means;
propulsion means mounted on said hull means;
a boom having a first end pivotally mounted to said hull means;
rigging means cooperatively associated with said hull means and said boom and operable to raise and lower said boom; and
bucket means mounted at a second end of said boom, said bucket means including a scoop portion pivotally attached to said boom and movable between open and closed positions and having an opening therein to receive the material being dredged and a stationary cover plate fixed to said boom adjacent said scoop portion cooperable with said scoop portion to substantially sealingly close said opening in said scoop portion when said scoop portion is in said closed position; said scoop portion further including a rear wall opposite said opening, said rear wall having at least one slot formed therein to accommodate the passage of water through said slot when said scoop portion is in the open position as it moves across the bottom of the body of water being dredged.

2. The dredge apparatus of claim 1, wherein said bucket means is constructed and arranged such that when the scoop portion moves from the open to the closed position the scoop portion pivots on a forward end of said scoop portion, which engages the bottom of the body of water being dredged to force said boom away from said bottom.

3. The dredging apparatus of claim 1, wherein said hull propulsion means includes first and second paddlewheels rotatably mounted on opposite sides of said hull.

4. The dredge apparatus of claim 3, wherein each of said paddlewheels is independently operable.

5. The dredging apparatus of claim 4, wherein said paddlewheels are hydraulically operated; and wherein further said propulsion means includes a hydraulic pump.

6. The dredge apparatus of claim 1, wherein said cover plate includes sealing means formed about the periphery of said cover plate.

7. The dredge apparatus of claim 6, wherein said sealing means comprises a rigid that extends from said cover plate, constructed and arranged to overlie a portion of the exterior of said scoop portion when said scoop portion is in said closed position.

8. The dredge apparatus of claim 2 further including an actuator means pivotally attached to and mounted between said boom and the scoop portion of said bucket, the pivot connection of said scoop portion to said boom being between said forward end of said scoop portion and the attachment point of said actuator to said bucket.

9. The dredge apparatus of claim 1 wherein the propulsion means provides the sole reactive force to the resistance of the material being dredged thereby permitting the use of the dredge without anchoring to the bottom.

* * * * *